(12) United States Patent
Engle (10) Patent No.: US 6,474,818 B1
(45) Date of Patent: Nov. 5, 2002

(54) MIRROR AND APERTURE BASED COLOR PHASE DETECTOR FOR USE IN A MULTIMEDIA PROJECTION SYSTEM

(75) Inventor: T. Scott Engle, Tualatin, OR (US)

(73) Assignee: InFocus Corporation, Wilsonville, OR (US)

( * ) Notice: Subject to any disclaimer, the term of this patent is extended or adjusted under 35 U.S.C. 154(b) by 52 days.

(21) Appl. No.: 09/627,640

(22) Filed: Jul. 28, 2000

(51) Int. Cl.[7] .................. G03B 21/14; G03B 21/00; H04N 9/12
(52) U.S. Cl. .................. 353/84; 353/31; 348/743
(58) Field of Search .................. 353/38, 30, 31, 353/33, 50, 81, 84, 97; 348/743

(56) References Cited

U.S. PATENT DOCUMENTS 6,155,687 A * 12/2000 Peterson .................. 353/84
6,185,047 B1 * 2/2001 Peterson et al. .................. 359/640
6,334,685 B1 * 1/2002 Slobodin .................. 353/31
6,356,700 B1 * 3/2002 Strobl .................. 385/147

* cited by examiner

Primary Examiner—Russell Adams
Assistant Examiner—Melissa J. Koval
(74) Attorney, Agent, or Firm—Stoel Rives LLP (57) ABSTRACT

A multimedia projector employing a color wheel housed within a shroud uses a light guide that is integral with the shroud and formed as an aperture extending through the shroud to transmit light from the color wheel to a photo detector that detects a particular color or colors of light to provide an index mark signal to a display controller to synchronize red, green, and blue image data with the associated color wheel filter segments. A reflector is located at an exit end of the light guide to reflect the light through a dichroic filter positioned on the shroud toward the photo detector on a circuit board.

9 Claims, 9 Drawing Sheets

MIRROR AND APERTURE BASED COLOR PHASE DETECTOR FOR USE IN A MULTIMEDIA PROJECTION SYSTEM

TECHNICAL FIELD

This invention relates to image projection displays and more particularly to a color wheel synchronization technique employed in an optical pathway of such displays.

BACKGROUND OF THE INVENTION

Projection systems have been used for many years to project motion pictures and still photographs onto screens for viewing. More recently, presentations using multimedia projection systems have become popular for conducting sales demonstrations, business meetings, and classroom instruction.

In common operating mode, multimedia projection systems receive analog video signals from a personal computer ("PC"). The video signals may represent still, partial-, or full-motion display images of a type rendered by the PC. The analog video signals are typically converted in the projection system into digital video signals that control a digitally driven image-forming device, such as a liquid crystal display ("LCD") or a digital micro mirror device ("DMD").

A popular type of multimedia projection system employs a light source and optical path components upstream and downstream of the image-forming device to project the image onto a display screen. An example of a DMD-based multimedia projector is the model LP420 manufactured by In Focus Systems, Inc., of Wilsonville, Oreg., the assignee of this application.

Significant effort has been invested into developing projectors producing bright, high-quality, color images. However, the optical performance of conventional projectors is often less than satisfactory. For example, suitable projected image brightness is difficult to achieve, especially when using compact portable color projectors in a well-lighted room.

Because LCD displays have significant light attenuation and triple path color light paths are heavy and bulky, portable multimedia projectors typically employ DMD displays in a single light path configuration. Producing a projected color image with this configuration typically requires projecting a frame sequential image through some form of sequential color modular, such as a color wheel.

The use of color wheels in frame sequential color ("FSC") display systems has been known for many years and was made famous (or infamous) in early attempts to develop color television sets. With technological advances; however, color wheel display implementations are still useful today.

Figure 1:
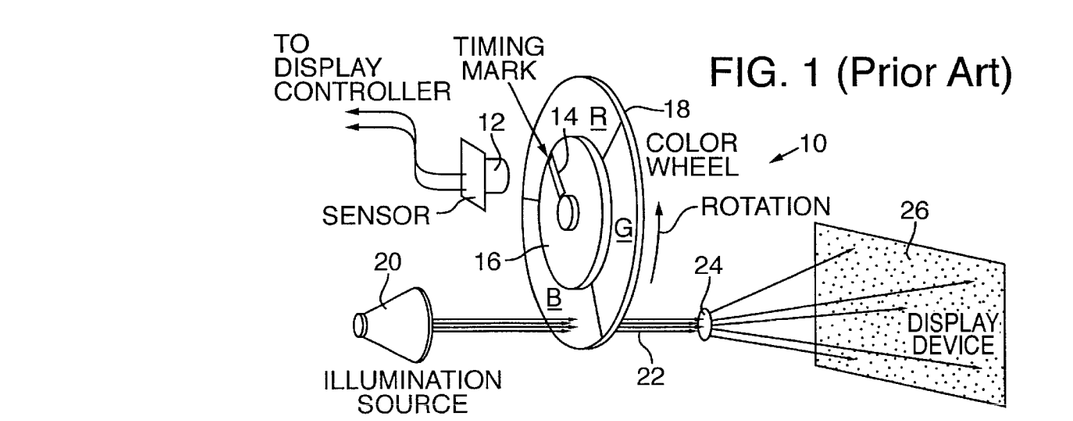
FIG. 1 is a simplified pictorial diagram showing the operating principle of a prior art FSC display device employing a color wheel having an optoelectrically sensed timing mark.

FIG. 1 shows a typical prior art FSC display system 10 in which a sensor 12 senses a timing mark 14 to detect a predetermined color index position of a motor 16 that rotates a color wheel 18 having respective red, green, and blue filter segments R, G, and B. A light source 20 projects a light beam 22 through color wheel 18 and a relay lens 24 onto a display device 26, such as an LCD-based light valve or a DMD. A display controller (not shown) drives display device 26 with sequential red, green, and blue image data that are timed to coincide with the propagation of light beam 22 through the respective filter segments R, G, and B of color wheel 18. Clearly, successful operation of a FSC display system depends on properly synchronizing the red, green, and blue image data to the angular position of color wheel 18.

Sensor 12 typically employs any of optoelectrical or electro mechanical shaft position or motor armature position detectors and usually requires some means for aligning timing mark 14 to the start of one of the filter segments. This alignment is typically a costly and error prone mechanical adjustment that accounts for angular differences between motor 16 and the mechanical mounting of filter segments R, G, and B. Of course, electrical or mechanical delays associated with sensor 12 further contribute to alignment errors.

The accumulated angular errors open the possibility of synchronization errors between the red, green, and blue image data to the angular position of color wheel 18, a possibility that prior workers avoided by building a timing duty cycle into the display controller electronics. The timing duty cycle provides for driving display device 26 with red, green, and blue image data for only a portion of the time when light beam 22 is propagating through each of respective filter segments R, G, and B, thereby preventing illuminating display device 26 with an improper color. Unfortunately, the timing cycle reduces the total amount of illumination available for displaying each color and, therefore, reduces the brightness of the resultant displayed color image.

Some attempts have been made to minimize color wheel synchronization errors. One example is described in copending U.S. patent application Ser. No. 09/354,998, filed Jul. 16, 1999, for LIGHT GUIDE FOR USE IN A COLOR WHEEL SYNCHRONIZATION APPARATUS AND METHOD, which is assigned to the assignee of this application. In this device, to achieve form factor goals and increase output lumens, light passes through a light integrating device, such as a light integrator tunnel, which minimizes or eliminates extra unused light downstream of the color wheel. A light guide is provided to transmit light propagated through the color wheel to a photo detector that detects a particular color or colors of light to provide an accurate index mark signal to a display controller to ensure that the appropriate red, green, and blue image data are properly synchronized with the associated color wheel filter segments. The integrator tunnel is adjacent to the light guide and provides uniform, high intensity light from the color wheel to a display device, such as a DMD.

The photo detector senses otherwise wasted light rays as sensing rays that are reflected by a light source reflector and propagated through the color wheel at predetermined locations adjacent to the integrator tunnel. To collect some of the sensing rays, the light guide is preferably bonded to the integrator tunnel. The light guide is formed from solid glass and is in the form of a solid glass rod. It operates by total internal reflection ("TIR"), and has a slanted output end that reflects the sensing rays toward a photo detector on a circuit board. The light guide is formed by an extrusion process and is made of solid glass. The inner surface of the light guide must be highly polished and coated to ensure that all of the light rays are collected and reflected toward the photo detector.

The light guide requires extensive manufacturing and assembly steps which include extruding it into shape and then performing post-extruding operations such as polishing and coating the inner surface. The light guide must then be bonded to the integrator tunnel in a very precise manner. These manufacturing steps make production of the light guide costly and time consuming. Additionally, the solid glass construction of the light guide adds unnecessary weight to the projection system.

It is desirable to have a projection system having a color wheel synchronization technique that circumvents the above-described problems and that is more cost effective to produce and that is light-weight.

SUMMARY OF THE INVENTION

An object of the present invention is to provide an apparatus for detecting an angular position of a color wheel in an FSC display system.

Another object of the present invention is to provide a color wheel synchronization system for a multimedia projector that is light weight, simple in design and construction, and less costly to manufacture.

A multimedia projector employing a color wheel in an FSC display system employs a light guide to transmit light propagated through the color wheel to a photo detector that detects a particular color or colors of light to provide an accurate index mark signal to a display controller to ensure that the appropriate red, green, and blue image data are properly synchronized with the associated color wheel filter segments. An integrator tunnel adjacent to the light guide provides uniform, high intensity light from the color wheel to a display device, such as a DMD.

The photo detector senses otherwise wasted light rays as sensing rays that are reflected by a light source reflector and propagated through a color wheel at predetermined locations adjacent to the integrator tunnel. To collect some of the sensing rays, the light guide is preferably formed in the housing or shroud of the motor that rotates the color wheel. The light guide is formed by an aperture or opening in the shroud that allows the light rays to pass through and reflect from a reflective surface toward the photo detector on a circuit board.

Since the color wheel rotates its filter segments from the light guide toward the integrator tunnel the photo detector senses color changes slightly before they are received by the DMD. This is advantageous because the resulting predictive timing is consistent from one projector to the next, thereby eliminating timing adjustments.

Forming the light guide integral with the motor shroud reduces the number of parts and eliminates costly and time consuming manufacturing steps, as well as reducing the weight of the projection system.

Additional objects and advantages of this invention will be apparent from the following detailed description of preferred embodiments thereof that proceed with reference to the accompanying drawings.

Additional objects and advantages of this invention will be apparent from the following detailed description of preferred embodiments thereof which proceeds with reference to the accompanying drawings.

DETAILED DESCRIPTION OF PREFERRED EMBODIMENT

Figure 2:
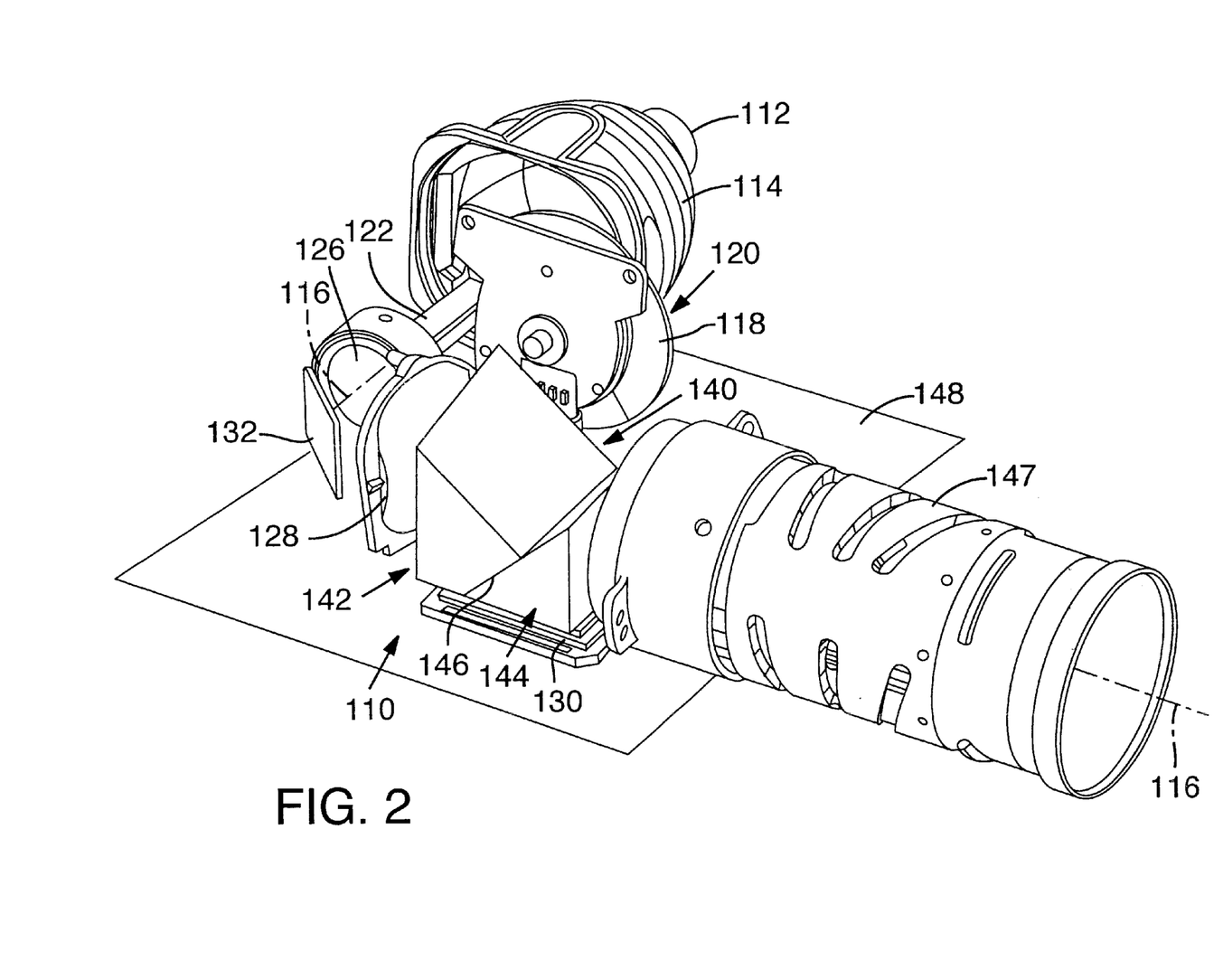
FIG. 2 is an isometric view of a preferred embodiment of the present invention shown without the shroud.
Figure 3:
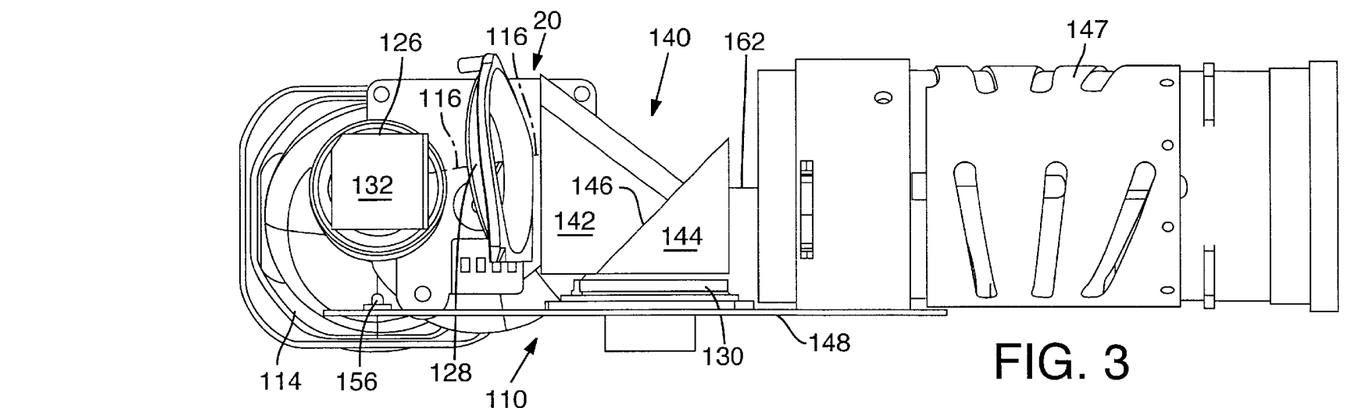
FIG. 3 is a side elevation view of the preferred embodiment shown in FIG. 2.
Figure 4:
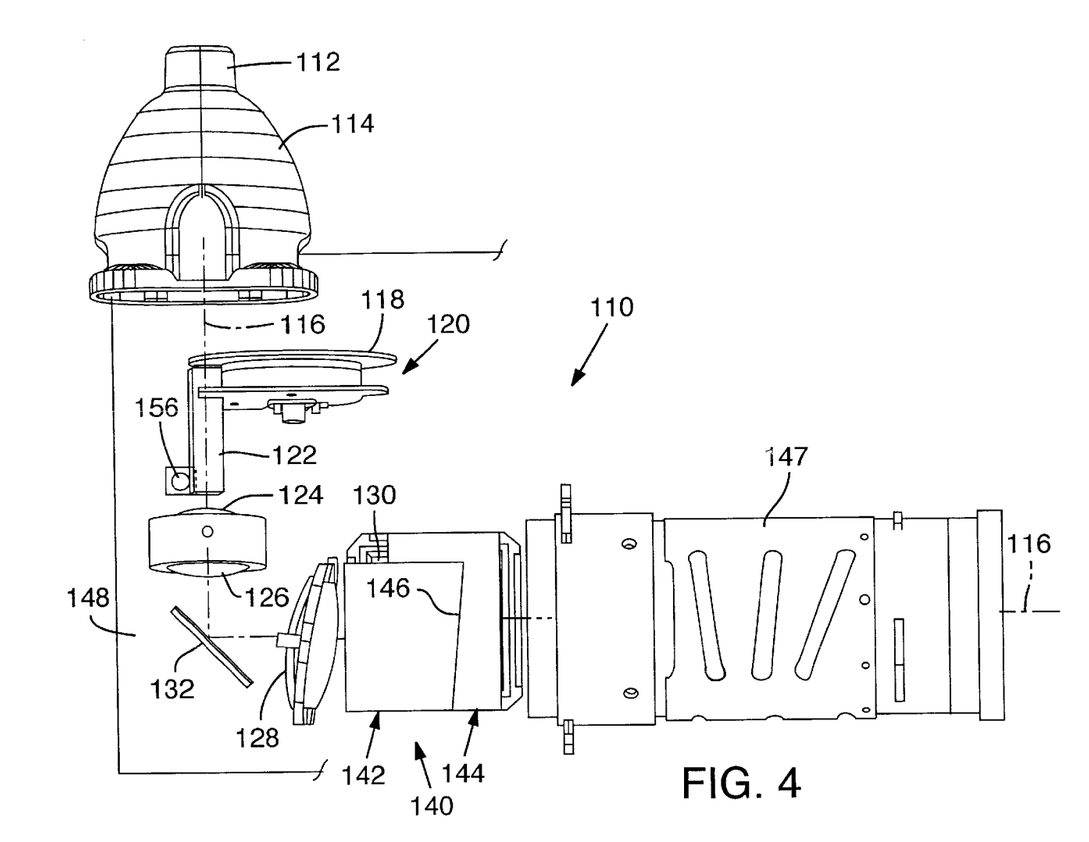
FIG. 4 is a top plan view of the shroud showing the integral light guide.

With reference to FIGS. 2–4, the image projection system 110 of the present invention includes a high power lamp 112 positioned at a focus of an elliptical reflector 114 having an F-number of approximately F/1 to produce a high intensity illumination beam that is characterized by a principle ray 116. High power lamp 112 is preferably a 120 watt, high pressure mercury arc lamp, which is suitable for use in an image projector to achieve its lifetime and lumen specifications. The mercury arc lamp has a nominal 1.3 mm arc gap, which contributes to high efficiency operation of the projector engine of image projection system 110. The small size of the arc gap impacts the alignment of the lamp arc to the rest of the optical system and increases the importance of the stability of the arc itself.

Figure 5:
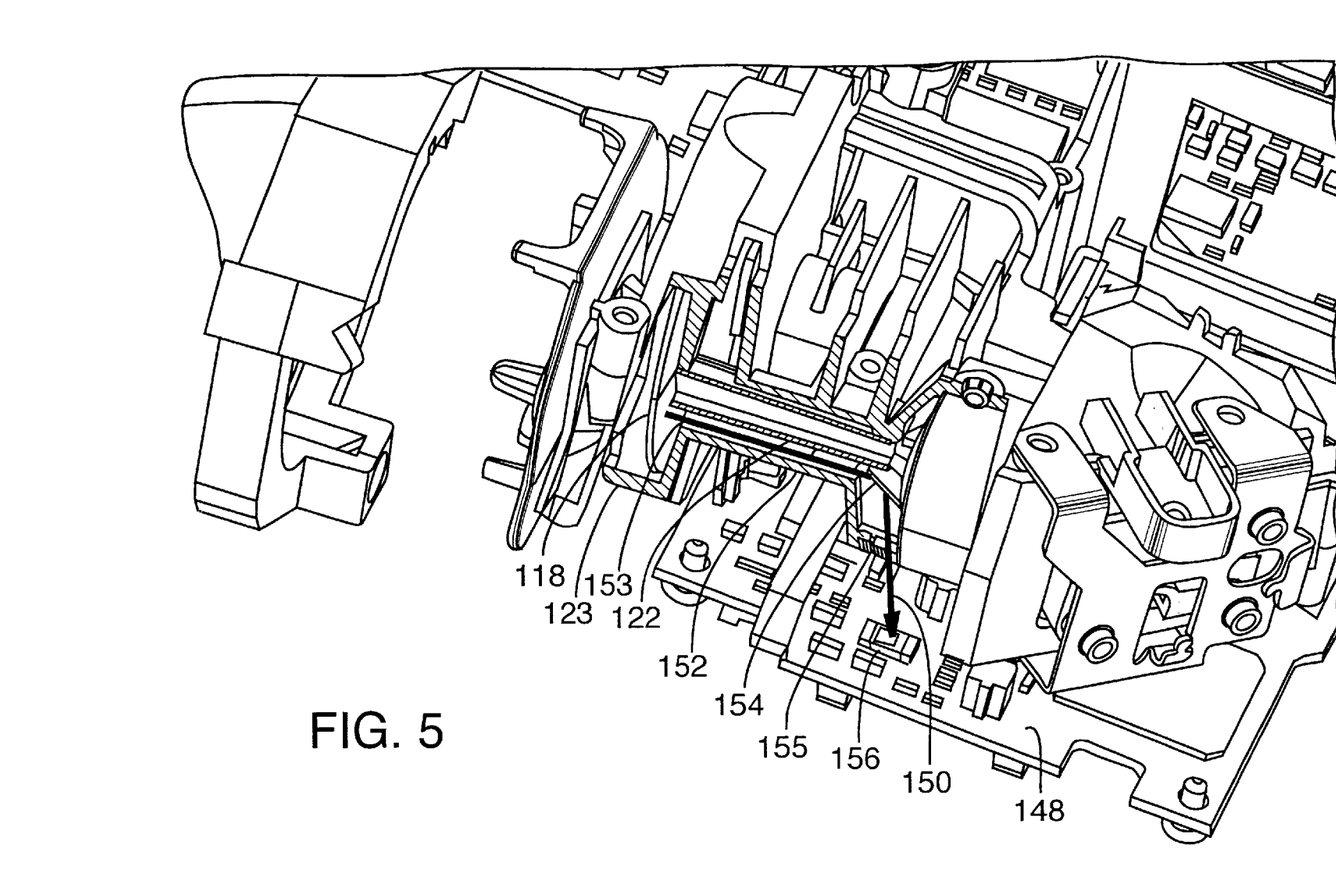
FIG. 5 is an isometric view of the preferred embodiment showing the shroud and integrator tunnel.
Figure 6:
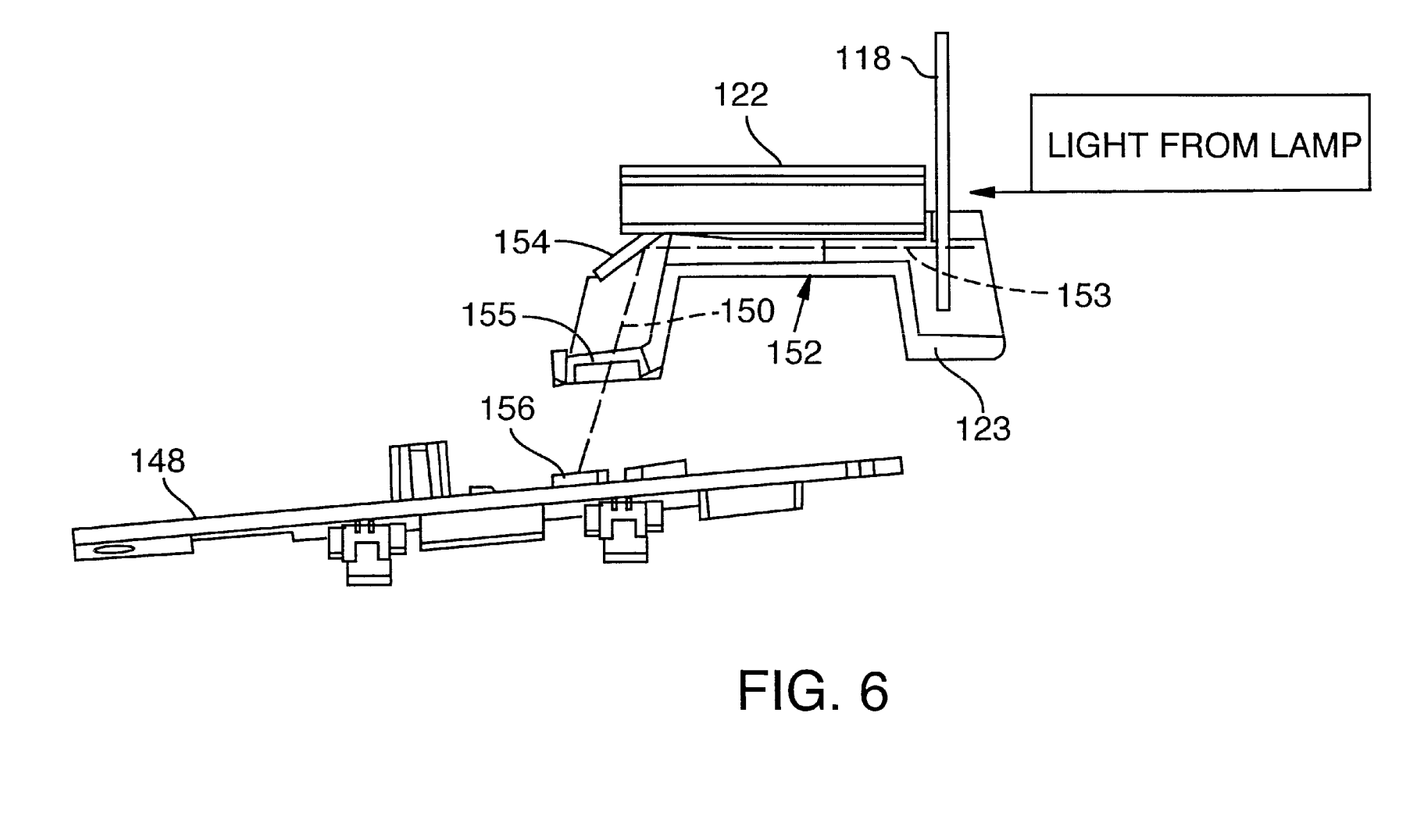
FIG. 6 is a simplified side elevation view of the preferred embodiment.

Lamp 112 is positioned at the first focus of elliptical reflector 114, which has cold mirror that reflects forward only visible light. Much of the infrared and ultraviolet light is transmitted and absorbed in the housing of elliptical reflector 114. The second focus of elliptical reflector 114 is positioned one-half the distance between the front face of a rotating color wheel disk 118 of a color wheel assembly 120 and an integrator tunnel 122. The color wheel assembly 120 is housed within a shroud 123 (FIGS. 5 and 6). The elliptical reflector 114 may be tilted upwardly 5 degrees from a horizontal datum plane to minimize the height of projection system 110. Color wheel disk 118 rotates at about 7,200 rpm, which is twice the system video image refresh rate, to sequentially display red, green, and blue images of a projector screen (not shown). Color wheel disk 118 may also include a white segment that functions to increase lumens while decreasing color saturation. All segments of color wheel disk 118 carry ultraviolet reflective coatings to prevent ultraviolet light from reaching ultraviolet sensitive components in the optical system.

Integrator tunnel 122 creates at its output end a uniform illumination pattern and facilitates delivering the illumination light past the motor of color wheel assembly 120 so that the motor does not create a shadow in the illumination. The integrator tunnel 122 may be one of any construction but in this embodiment the integrator tunnel 122 is composed of a solid glass rod that relies on total internal reflection to transfer light through it. Integrator tunnel 122 may also include a cladding that supports the integrator tunnel 122 without disrupting total internal reflection. The uniform illumination pattern of light propagating from the output end of integrator tunnel 122 is of rectangular shape and is imaged through lens elements 124, 126, and 128, onto a light reflecting surface of a DMD 130. Integrator tunnel 122 is rotated 8 degrees about its major axis to correct for rotation in the illumination on DMD 130, which rotation is caused by a prism assembly 140 described below.

The DMD 130 is preferably a Texas Instruments Model DMD 1076 spatial light modulator composed of a rectangular array of aluminum micro mechanical mirrors, each of which can be individually deflected at an angle of plus or minus 10 degrees about a hinged diagonal axis. The deflection angle (either positive or negative) of the mirrors is individually controlled by changing the memory contents of underlying addressing circuitry and mirror reset signals. Lens element 128 is tilted upwardly 6 degrees from the horizontal datum plane and rotated −10 degrees about the vertical axis to partly correct for distortion caused by oblique illumination of DMD 130. A beam direction turning mirror 132 positioned between an exit face of lens element 126 and an entrance face of lens element 128 turns the beam direction in an X-Z plane about 90 degrees within the housing of projection system 110.

Illumination light exiting lens element 128 enters prism assembly 140 that is comprised of a first or compensating prism 142 and a second or output prism component 144 that are spaced apart by an air space interface 146. Prism assembly 140 allows DMD 130 to lie flat when in operation. Prism assembly 140 sets up the correct illumination angle on DMD 130 and separates by total internal reflection discrimination the illumination light from the imaging light reflected by DMD 130 in its on-state. The illumination angles for DMD 130 are controlled by the angles of the faces of prism assembly 140. Prism assembly 140 refracts and reflects the incident light bundle so that the DMD 130 is illuminated from a corner with a projection angle partly built into the output light bundle. After the illumination light reflects off DMD 130 in its on-state, imaging light exits prism assembly 140 along essentially the same propagation direction as that of illumination light entering prism assembly 140. Because of the many degrees of freedom in prism assembly 140, light can enter it roughly parallel to a support table and in line with a projection lens 147. In a preferred case, DMD 130 is mounted to the surface of a single printed circuit board 148 that covers the bottom of the projector. This provides a cost-effective solution because it eliminates the need for a high-density electrical connector otherwise required between printed circuit board 148 and off-board DMD.

As described above, integrator tunnel 122 creates at its output end a uniform illumination pattern that facilitates delivering the illumination light past the motor of color wheel assembly 120. Because the output end of integrator tunnel 122 is imaged through prism assembly 140 and onto DMD 130 with minimal overfill, there is no practical place adjacent to the light path to place a color wheel synchronization photo detector for receiving scattered light without robbing DMD 130 of lumens.

However, as best shown in FIGS. 5 and 6, this invention senses otherwise wasted light rays as sensing light rays 150 that are reflected by reflector 114 and propagate through color wheel assembly 120 at locations adjacent to integrator tunnel 122. To collect some of sensing rays 150, a light guide 152 is formed in the shroud 123 as an aperture 153 that extends through the shroud 123 to allow the sensing rays 150 to reach a reflector 154 located at an end of the aperture 153. The reflector 154 may be attached directly to the shroud 123 or may be attached to a clip or other retainer for connection with the shroud 123. Additionally, the reflector 154 may be attached to the integrator tunnel 122. The reflector 154 is angled at about 50 degrees to normal to reflect sensing rays 150 through a dichroic filter 155 positioned on the shroud 123 toward circuit board 148. The reflector 154 may be a mirror or any reflective surface, such as, for example, a reflective piece of metal. A photo detector 156 is positioned on circuit board 148 to receive the maximum angle of incident sensing rays 150.

Because light guide 152 is positioned slightly below integrator tunnel 122, and because the color wheel angularly rotates its filter segments from light guide 152 toward integrator tunnel 122, photo detector 156 senses color changes slightly before they are received by DMD 130. This is advantageous because the resulting predictive timing is consistent from one projector to the next, thereby eliminating the need for a delay adjustment. Only a fixed delay is required for correct synchronization of color wheel assembly 120 color changes and the frame sequential color images driving DMD 130. The amount of fixed delay substantially equals the rotational latency time for color wheel assembly 120 to rotate from light guide 152 to integrator tunnel 122 plus the time required to process the color changes sensed by photo detector 156 and its associated circuitry. Accordingly, maximum luminance efficiency and color purity is realized by image projection system 110.

Forming the light guide 152 to be integral with the shroud 123 reduces the number of parts and eliminates costly and time consuming manufacturing steps, as well as reducing the weight of the projection system 110.

Figure 7:
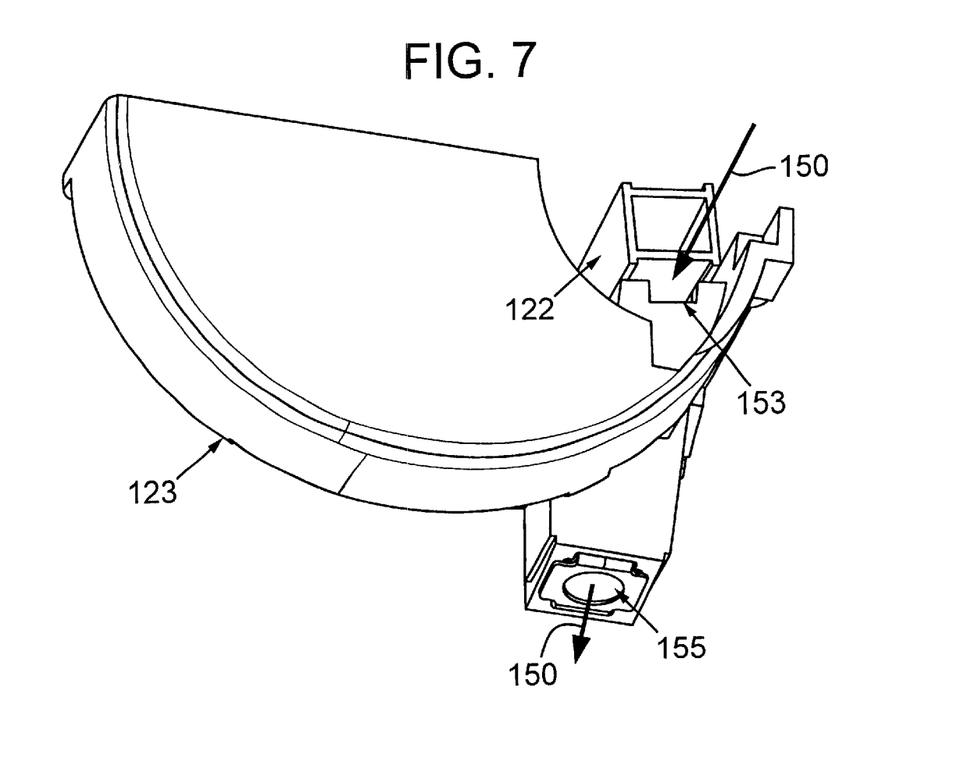
FIG. 7 is an isometric bottom view of the shroud.
Figure 8:
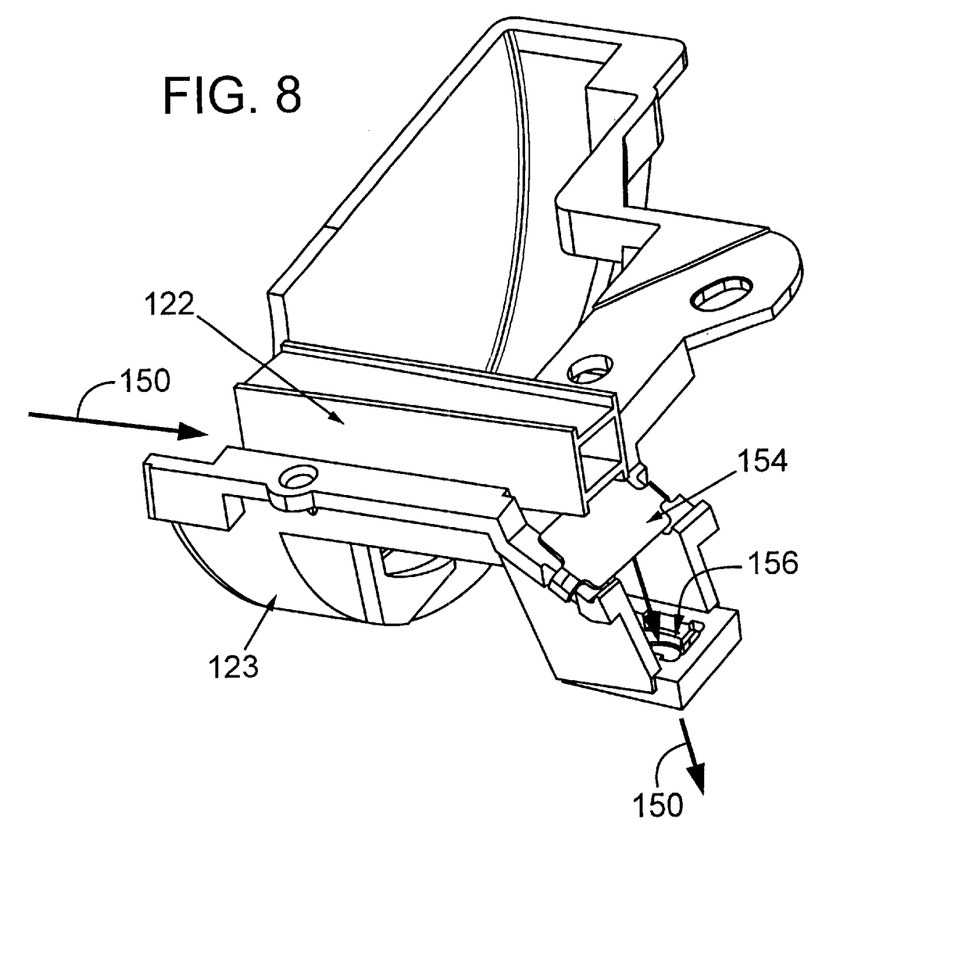
FIG. 8 is an isometric top view of the shroud.
Figure 9:
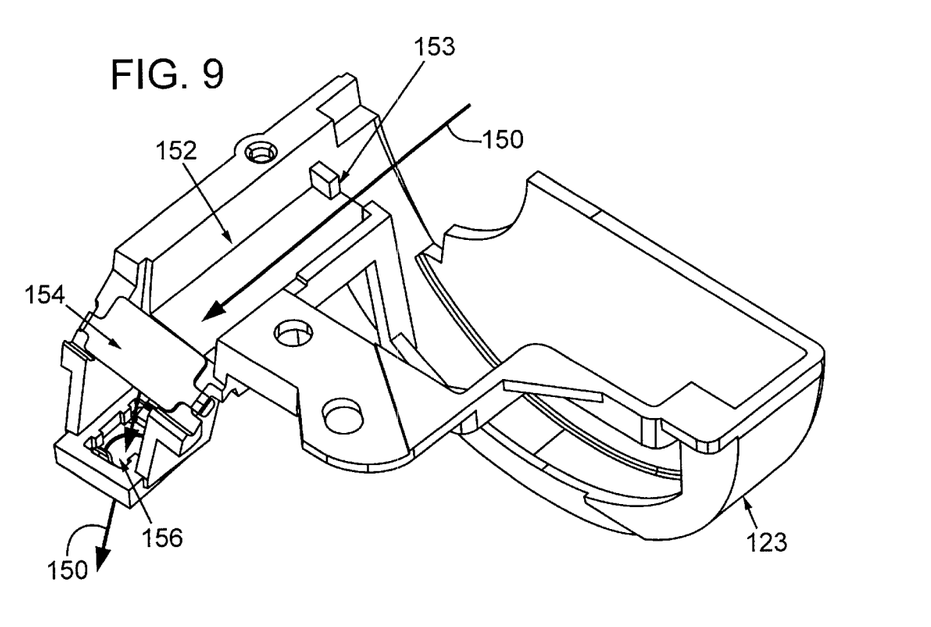
FIG. 9 is an isometric top view of the shroud with the integrator tunnel removed.

FIGS. 7–9 more clearly show the light guide 152 formed integrally with the shroud 123. FIG. 7 shows the entrance end of the integrator tunnel 122 with the opening of the aperture 153 formed in the shroud 123 allowing the sensing rays 150 to enter the aperture 153. FIG. 8 shows the exit end of the integrator tunnel 122 with the reflector 154 positioned to direct the sensing rays 150 through the dichroic filter 155 and toward photo detector 156. FIG. 9 shows the shroud 123 with the integrator tunnel 122 removed revealing the aperture 153.

Employing light guide 152 is further advantageous because it reflects sensing rays 150 through the air towards photo detector 156, which is separately mounted on circuit board 148. Because light guide 152 and photo detector 156 are separated, there is a much reduced chance of damaging either of them during assembly or servicing. Moreover, this protection comes without the cost of an additional connector and cabling and their associated assembly and testing.

Color wheel synchronization is achieved by detecting which color filter segment is in the light path and for how long. Particular colors of light propagating through the color wheel assembly are sensed to generate synchronization timing data.

Figure 10:
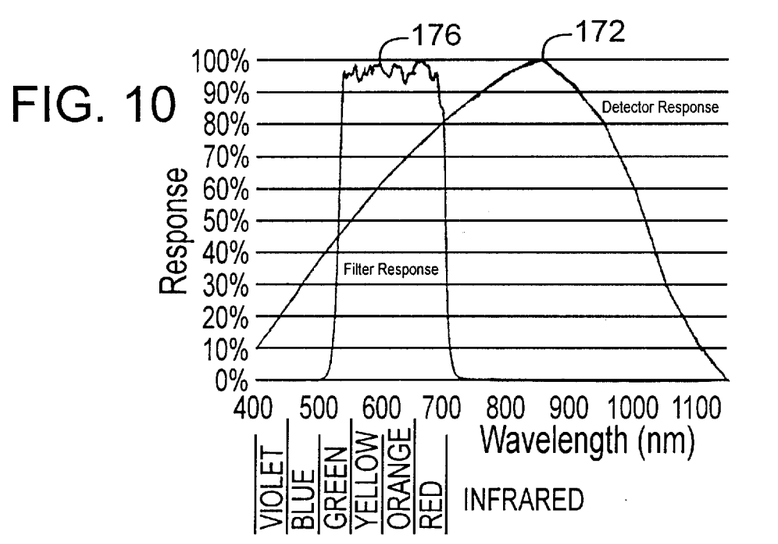
FIG. 10 graphically represents the spectral responses of an optoelectric detector and a filter employed in the color wheel synchronization technique of this invention.
Figure 11:
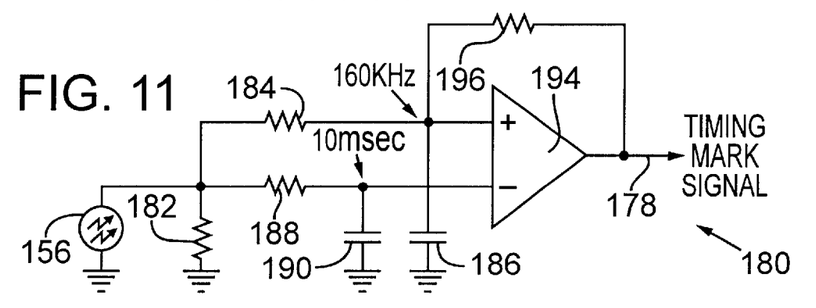
FIG. 11 is a simplified schematic circuit diagram of a timing mark signal generator that conditions, integrates, and threshold detects signals received from the optoelectric detector in FIG. 10.

However, in this invention, photo detector 156 is positioned to receive sensing rays 150 collected and reflected from light guide 152. Referring to FIGS. 10 and 11, photo detector 156 has a maximum spectral response 172 to deep red and near IR light wavelengths. Photo detector 156 is preferably a model SFH 203 manufactured by Siemens Components of Cupertino, Calif. Its spectral selectivity is tuned by an optical filter (not shown) inserted in the optical path between color wheel assembly 120 and photo detector 156. The optical filter is preferably a predominantly yellow filter having a filter response 176 that passes green, yellow, orange, and red wavelengths of light but attenuates blue and near IR wavelengths of light.

Color wheel assembly 120 includes filter segments R, G, and B that are typically separated by very narrow gaps, through which some of the polychromatic light emitted by high power lamp 112 may leak. Because polychromatic, red, and green light are all substantially propagated through the optical filter, photo detector 156 does not significantly discriminate between the polychromatic light leaking through the gaps and the light propagating through filter segments R and G. However, because the optical filter attenuates blue wavelengths of light, the entry and exit of filter segment B in optical path 34 is readily detected by photo detector 156. Morever, because filter segment B immediately rotationally precedes filter segment R, the exit of filter segment B from the optical path is preferably used to generate a timing mark signal 178 for predicting the entry of filter segment R into alignment with integrator tunnel 122. Any polychromatic light propagating through the gap between filter segments B and R is simply interpreted by photo detector 156 as the start of filter segment R.

Figure 12:
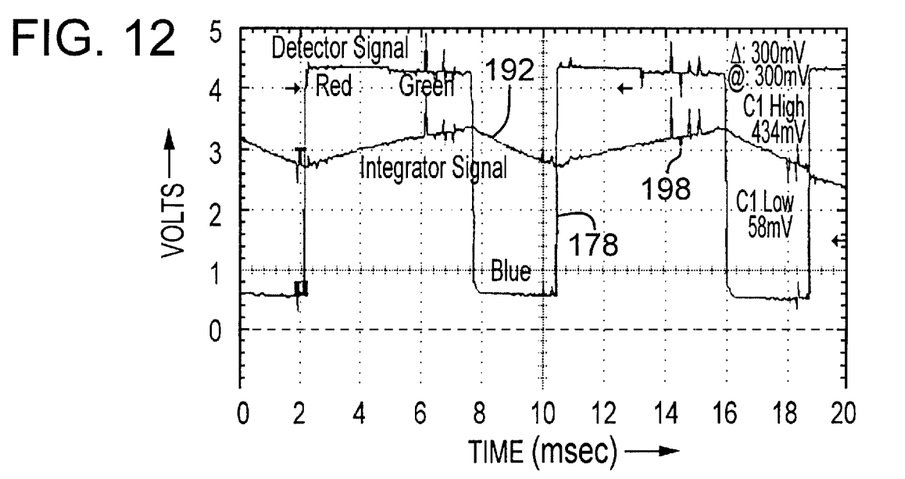
FIG. 12 graphically represents various electrical waveforms generated by the index mark signal generator of FIG. 11.

FIGS. 11 and 12 respectively show a timing mark signal generator 180 and timing waveforms suitable for use with this invention. Photo detector 156 generates a detector signal across a 10,000 ohm resistor 182, which detector signal is electrically connected to the respective filter and integrator inputs of timing mark signal generator 180.

The filter input includes a 10,000 ohm resistor 184 electrically connected in series with a 100 picoFarad capacitor 186 to form at their junction a low pass filter node having a 160 kilohertz cutoff frequency suitable for reducing bursty signal noise. A filtered detector signal appears at the low pass filter node.

The integrator input includes a 100,000 ohm resistor 188 electrically connected in series with a 0.1 microfarad capacitor 190 to form at their junction an integrator node having a 10 millisecond time constant suitable for integrating the detector signal. An integrated detector signal 192 appears at the integrator node.

The filter and integrator nodes are electrically connected to respective noninverting and inverting inputs of a comparator 194, which is preferably a type LM392 manufactured by National Semiconductor, Inc. of Mountain View, Calif.

Comparator 194 functions as a threshold comparator that compare the filtered detector signal appearing on the filter node to a threshold level, which is preferably integrated detector signal 192 that appears on the integrator node. Timing mark signal 178 appears at the output of comparator 194 as a nonsymmetrical squarewave having about a 0.6 volt "low" value when filter segment B is sensed and having about a 4.4 volt "high" value when filter segment B is not sensed (filter segment R or G or a gap in optical path 34). A 3.32 megohm feedback resistor 196 is electrically connected between the output and noninverting input of comparator 194 to provide the threshold level with about a 20 millivolt hysteresis band. The hysteresis band increases the switching speed and improves the noise immunity of comparator 194.

Employing integrated detector signal 192 as a comparator threshold level provides an automatic threshold adjustment function that accounts for long-term changes in the intensity of high power lamp 112. Moreover, integrated detector signal 192 has an average value 198 that is indicative of the intensity of high power lamp 112. Because high power lamp 112 has an end-of-life time defined as the time when its intensity degrades to 50% of its original intensity, average value 198 can be monitored to predict when to replace high power lamp 112.

This invention is advantageous because the timing mark synchronization accuracy is independent of moderate illumination intensity changes, mechanical alignment errors, and color wheel rotational velocity changes.

The inherent simplicity and accuracy of the color wheel synchronization technique of this invention enables implementing a lighter weight, simpler, brighter, and less costly multimedia projector.

Skilled workers will recognize that portions of this invention may be implemented differently than the implementations described above for preferred embodiment. For example, this invention is suitable for use with many different optical paths, light sources, display devices, display controllers, and FSC data formats. The color wheel may have a variety of different filter segment colors, color combinations, and rotational sequence orders, and their individual angular widths may be unequal to compensate for different filter factors and light path-related color attenuations. Likewise, the light sensor may synchronize the display controller in many different ways including detecting the appearance or disappearance of any filter wheel segment color or combinations of colors. Finally, the timing mark signal generator is not limited to the particular circuit topology and values described.

Alternative embodiments of light guide—may include a lens attached to its light exiting surface to better focus light on photo detector—. This added lens may be offset to redirect and focus the light to a more useful position, or may be wedge shaped (infinite radius of curvature) to simply redirect the light. Depending on the relative spacing and positioning of light guide—and photo detector—, the added lens may have a predetermined radius and be offset from the longitudinal center of light guide—to focus and redirect the light toward photo detector—.

Skilled workers will further recognize that many changes may be made to the details of the above-described embodiments of this invention without departing from the underlying principles thereof. Accordingly, it will be appreciated that this invention is also applicable to color synchronization applications other than those found in multimedia projectors. The scope of this invention should, therefore, be determined only by the following claims.

It will be obvious to those having skill in the art that many changes may be made to the details of the above-described embodiment of this invention without departing from the underlying principles thereof. The scope of the present invention should, therefore, be determined only by the following claims.

What is claimed is:

1. An apparatus for synchronizing frame sequential color image data and color modulated light propagating from a color modulation device, comprising:

a light source emitting polychromatic light that propagates along an optical path and otherwise wasted light that propagates adjacent to the optical path;

a color modulation device housed within a shroud and positioned generally along the light path to change the polychromatic light into color modulated light and the wasted light into color modulated sensing light;

a light guide formed within the shroud for receiving the color modulated sensing light and propagating the color modulated sensing light out an exit end of the light guide;

a photo detector positioned to receive the color modulated sensing light exiting the light guide, the photo detector causing generation of a timing mark signal in response to receiving predetermined wavelengths of color modulated sensing light; and a display controller generating the frame sequential color image data in response to receiving the timing mark signal.

2. The apparatus of claim 1 in which the light guide is formed as an aperture extending through the shroud in a direction along the optical path.

3. The apparatus of claim 2 in which a reflector is located at the exit end of the light guide to redirect the light path of the color modulated sensing light in a direction toward the photo detector.

4. The apparatus of claim 3 in which the reflector is a mirror.

5. The apparatus of claim 3 in which the reflector is a metallic surface.

6. The apparatus of claim 3 in which the reflector is integral with the shroud.

7. The apparatus of claim 3 in which the reflector is removably attached to the shroud.

8. The apparatus of claim 1 further comprising a dichroic filter positioned on the shroud through which the color modulated sensing light travels.

9. The apparatus of claim 8 in which the dichroic filter is positioned between the reflector and the photo detector.

* * * * *